United States Patent
Tidwell

(10) Patent No.: US 7,978,604 B2
(45) Date of Patent: Jul. 12, 2011

(54) OPTIMISING RESOURCE USAGE IN A PACKET SWITCHED NETWORK

(75) Inventor: Paul Tidwell, Redmond, WA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 775 days.

(21) Appl. No.: 10/590,937

(22) PCT Filed: Feb. 27, 2004

(86) PCT No.: PCT/EP2004/050229
§ 371 (c)(1),
(2), (4) Date: Jun. 26, 2007

(87) PCT Pub. No.: WO2005/086404
PCT Pub. Date: Sep. 15, 2005

(65) Prior Publication Data
US 2007/0297331 A1    Dec. 27, 2007

(51) Int. Cl.
*G01R 31/08* (2006.01)
(52) U.S. Cl. .................. 370/232; 370/231; 370/477
(58) Field of Classification Search .................. None
See application file for complete search history.

(56) References Cited

U.S. PATENT DOCUMENTS

| | | | | |
|---|---|---|---|---|
| 5,490,168 A | * | 2/1996 | Phillips et al. | 375/224 |
| 6,252,910 B1 | * | 6/2001 | West et al. | 375/261 |
| 2002/0059464 A1 | * | 5/2002 | Hata et al. | 709/247 |
| 2003/0117972 A1 | * | 6/2003 | Vimpari | 370/328 |
| 2003/0161326 A1 | * | 8/2003 | Pazhyannur et al. | 370/395.52 |
| 2006/0153232 A1 | * | 7/2006 | Shvodian | 370/468 |

FOREIGN PATENT DOCUMENTS

| EP | 1120932 A1 | * | 8/2001 |
|---|---|---|---|
| EP | 1 120 932 A |  | 9/2001 |

OTHER PUBLICATIONS

International Search Report of PCT/EP2004/50229, mailed Oct. 14, 2004.
Shinsuke Hara et al., "Throughput performance of SAW-ARQ Protocol with Adaptive Packet length in Mobile Packet Data Transmission", IEEE Transactions on Vehicular Technology, vol. 45, No. 3, Aug. 1, 1996, pp. 561-569, XP000632299.

* cited by examiner

*Primary Examiner* — Chi H Pham
*Assistant Examiner* — Kouroush Mohebbi
(74) *Attorney, Agent, or Firm* — Nixon & Vanderhye P.C.

(57) ABSTRACT

A method of optimising the bandwidth usage on a Real-Time Protocol managed link transporting media from a Media Resource Function of a cellular telecommunications network to User Equipment. The method comprises monitoring properties of the link and, as a result of said monitoring, adapting the sending rate over the link by re-packetising media, received at the Media Resource Function from third party nodes, to increase or decrease the size of packets sent over the link.

7 Claims, 2 Drawing Sheets

OPTIMISING RESOURCE USAGE IN A PACKET SWITCHED NETWORK

This application is the US national phase of international application PCT/EP2004/050229, filed 27 Feb. 2004, which designated the U.S., the entire content of which is hereby incorporated by reference.

FIELD OF THE INVENTION

The present invention relates to optimising resource usage in a packet switched network and more particularly within a packet switched network of a cellular telecommunications network.

BACKGROUND TO THE INVENTION

Many operators of existing 2G cellular telecommunication networks have now introduced packet switched based data services. In GSM networks, these services are facilitated by the General Packet Radio Service (GPRS) protocols and systems. A typical network architecture is illustrated in FIG. 1. The 3G standards (produced by the $3^{rd}$ Generation Partnership Project) have introduced the concept of a Media Resource Function (MRF) 1 which is intended to act as a general purpose media handling node and might typically be located within an IP Multimedia Sub-System (IMSS) 4 of the cellular network. MRF nodes may also be introduced into 2G networks offering packet switched based data services.

One specific function of the MRF is in the handling of Voice over IP (VoIP) conference calls including the mixing and distribution of user media. In an example architecture, participants 3 in a conference call establish the call using Session Initiation Protocol (SIP) signalling which is facilitated and routed through the IMSS 4. A SIP server 5 known as the Serving Call Session Control Function (S-CSCF) routes SIP signalling to and from the MRF 1 in order to establish and control calls. Once a session has been established, media is routed between the MRF and user terminals (referred to below as "User Equipment" or UEs) via the Radio Access Network (RAN) 6 and the GPRS core network 7 (in particular via the GPRS Gateway Support Nodes (GGSNs) 8). NB. In FIG. 1 only connections between a first of the UEs 3 and the network elements are shown in detail. The connections between the network and the other UEs (identified by dotted lines) merely indicate the exchange of data (i.e. respective RANs, IMSS, etc are omitted).

The Real time Transport Protocol (RTP) is an Internet protocol standard that defines a way for applications to manage the real-time transmission of multimedia data. RTP is used at the bearer or media level (as opposed to the call control level which employs SIP or other call control protocol) for Internet telephony applications including VoIP. RTP does not guarantee real-time delivery of multimedia data, as this is dependent on the actual network characteristics. RTP provides the functionality to manage the data as it arrives to best effect. User Plane Adaptation (UPA) is the procedure used by the MRF and a given UE to monitor the RTP traffic between them and to adjust bandwidth utilisation in an attempt to provide optimal quality during a talk session. UPA provides for the MRF to dynamically redefine the talk burst duration which is encapsulated in a given RTP packet on a given link (this parameter is known as ptime) and the codec used for that link (the codec is identified by one of a number of parameters contained in a "mode set"). The SIP message reINVITE/UPDATE is used to signal these parameters to the UE. The UE may also send this message to the MRF in order to notify the MRF of its capabilities/requirements.

The group know as the Open Mobile Alliance has developed a Push to talk Over Cellular (PoC) specification aimed at enabling the provision of services over standard mobile networks which resemble walkie-talkie services, i.e. at the push of a button a subscriber can be instantly connected to one or more other subscribers. PoC relies upon the MRF to set up and handle connections. The PoC specification describes the tools available to detect packet loss over the links between the MRF and individual UEs. PoC also describes a means to request a change in bandwidth utilization, but does not provide detailed algorithms or procedures to enable this.

SUMMARY

According to a first aspect there is provided a method of optimising the bandwidth usage on a Real-Time Protocol managed link transporting media from a Media Resource Function of a cellular telecommunications network to User Equipment, the method comprising:
monitoring properties of the link; and
as a result of said monitoring, adapting the sending rate over the link by re-packetising media, received at the Media Resource Function from third party nodes, to increase or decrease the size of packets sent over the link.

The technology is applicable in particular to networks in which the Media Resource Function is arranged to handle media distribution for Push-to-talk over Cellular services.

Example Embodiments have the advantage that adaption on the downlink can be achieved without having to vary the packet sizes transmitted by third party nodes. Thus, transmission delays on these uplinks to the Media Resource Function are maintained at optimum levels. An additional consequential benefit is that bandwidth usage can be adapted without having to signal to other UEs. Expensive additional signalling traffic is thus avoided.

Preferably, the method comprises re-packetising received media only into packet sizes which are larger than the packet sizes in which the media is received at the Media Resource Function.

Typically, the step of monitoring the properties of the link comprises sampling the rate of packet loss on the link. This may be carried out at the receiving UE, with the UE sending the samples to the Media Resource Function. The Media Resource Function adjusts the sent packet size in order to reduce the rate of packet loss on the link or to decrease the transmission delay. In particular, when the rate of packet loss is unacceptably high, the Media Resource Function may re-packetise incoming media into larger packets, thereby reducing the packet header overhead and reducing the bandwidth usage on the downlink. When the rate of packet loss is within acceptable limits, the incoming media may be re-packetised to reduce the packet size, thereby reducing the transmission delay over the link.

It will be appreciated that said step of adapting the sending rate is carried out dynamically in response to the monitored rate of packet loss.

Preferably, in the event that media is to be repacketised at the Media Resource Function, received media is stored at the Media Resource Function in a buffer until such time as sufficient media has been received to construct a packet of the necessary size.

Said third party nodes are typically peer User Equipment (UEs), although they may be other nodes such as web servers, etc.

According to a second aspect there is provided a Media Resource Function node for use in a cellular telecommunications network, the node handling media sent between itself and user equipment over a Real-Time Protocol managed link, the node comprising:
  means for monitoring properties of the downlink to the User Equipment; and
  means for adapting, based upon the monitored properties, the sending rate over the link by re-packetising media received from third party nodes, to increase or decrease the size of packets sent over said downlink

DETAILED DESCRIPTION

Figure 1:
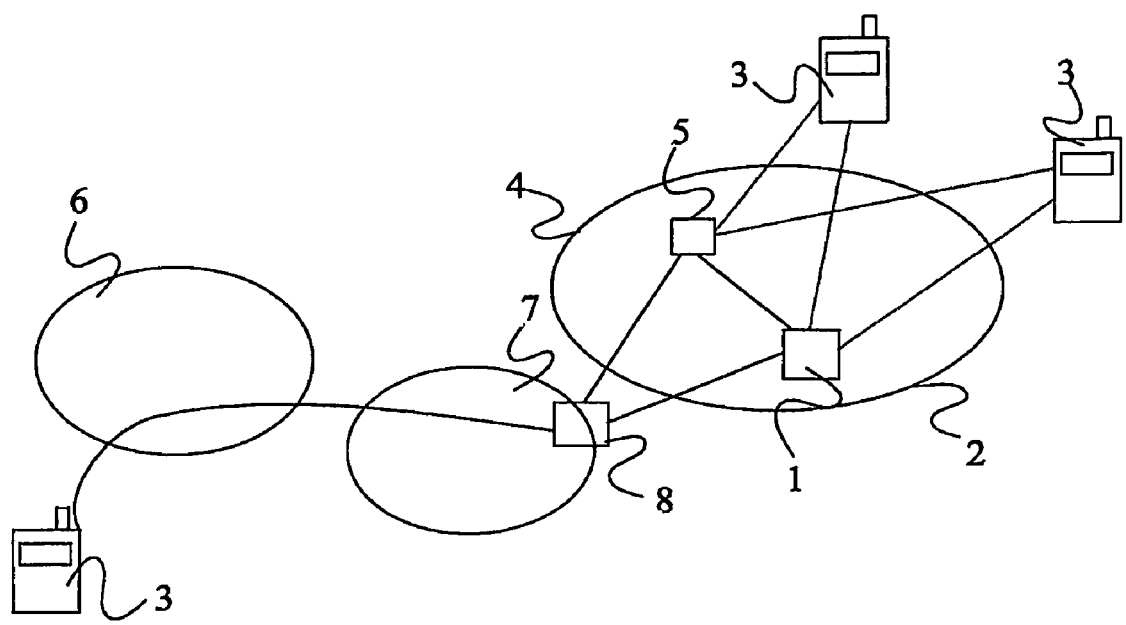
FIG. 1 illustrates schematically the architecture of a cellular telecommunications network employing a MRF node to coordinate VoIP voice conferencing.

Considering now in detail the PoC service, a single MRF can manage thousands of talk sessions, with each session being independent from other sessions that may be hosted by the same MRF. A given talk session will comprise two or more pieces of user equipment (UE) and the central MRF. These UEs might each have different capabilities. Talk bursts from a UE are encoded and sent to the MRF (via respective GGSNs) as one or more RTP packets, referred to here as simply "packets". The MRF then forwards the packets to the or each other UE participating in the same talk session. The path which the packets take from the UE to the MRF is called the "uplink". The path which packets take from the MRF to the UE is called the "downlink". The rate of packet loss may be different for each link in the chain. Particularly for real-time applications such as VoIP, the quality of the perceived user experience is critically dependent upon the rate of packet loss. A talk session involving ten UEs will involve twenty different links (UE to MRF and MRF to UE) and therefore twenty different potential trouble areas.

As set out above, User Plane Adaptation (UPA) is the procedure used to detect and then reduce packet loss for the duration of a talk session. Once it has been determined that the level of packet loss occurring on a given link is sufficiently high to affect perceived service quality, the UPA procedure will act to reduce packet loss. The only practical tool available to the MRF and the UEs for achieving this result is the reduction of bandwidth usage on the troubled link. Bandwidth can be reduced by using a higher compression rate codec and/or by reducing transport overheads by sending larger packets.

Uplink Packet Loss

The MRF is responsible for detecting packet loss on the uplink from each UE. A UE is notified of packet loss by the MRF sending to it an RTCP Receiver Report (RR). A RR provides the total number of packets lost since the talk session began. The packets lost over a given talk burst can be calculated by subtracting the packet loss identified in the latest report from that identified in the last received report.

Downlink Packet Loss

The UE is responsible for detecting packet loss on the downlink. The UE will send an RR to the MRF after each talk burst is received on the downlink, thereby informing the MRF of any lost packets.

A packet receiver (at the MRF or UE) detects packet loss by measuring gaps in the RTP sequence numbers used in a packet stream. Let $S_h$ be the highest sequence number received, let $S_l$ be the lowest sequence number received, and let P be the total number of packets received. Then the number of lost packets is:

$$\text{Lost} = ((S_h - S_l) + 1) - P$$

As some packets may be duplicates, it is possible to arrive at a negative value for the number of packets lost. This is inconsequential here. This simple formula requires that the RTP sequence number is maintained throughout the talk session (allowing for wrap-around of sequence numbers), and is not restarted at the beginning of each burst.

Throughout a session, the MRF and UE can detect the loss of packets. However, an occasional loss of packets should not trigger link adaptation. Rather, adaptation of the link should be triggered only by continued packet loss over many samples. Packet loss samples are taken periodically, occasionally triggering bandwidth adaptation if continued loss is evident.

A sample loss rate is calculated for each link at the end of each talk burst received on that link or when a receiver report (RR) arrives. The rate of loss for a single sample is the number of packets lost since the last sample. The rate of loss over several samples is the average sample loss rate.

The loss analysis procedure uses five parameters:
1. The sampled loss, L.
2. The number of samples N required in order to calculate the rate of loss. The rate of loss RL, where: $RL = (L_n - L_{(n-N+1)})/N$ and n is the most recently sampled loss.
3. The acceptable rate of loss. Call this value ARL.
4. The time that must pass between attempts to perform bandwidth adaptation. Call this value T. This value may be defined in terms of samples rather than actual time.

Once the node has gathered N samples, it can begin to calculate RL. The rate of loss calculation only includes the last N samples as defined by a sliding window which is advanced by one sample each time a new sample is obtained. If RL exceeds the ARL value and a time T has passed since the last link adaptation, then a bandwidth adaptation procedure is initiated. The MRF will be configured with the values for N, ARL, and T. The UE may be similarly configured, or these values may be hard coded.

Once a bandwidth efficiency improvement measure has been applied to a link it is said that the link has been 'downgraded'. Links that perform well in a downgraded state may be upgraded later. A link that has been previously downgraded will begin performing well either because the new bandwidth utilisation is ideal for the link conditions, or because the problems causing packet loss have dissipated. Therefore, the UPA process should upgrade a previously downgraded link after some period of good performance. It is necessary, therefore, to define good performance and the period of good performance that must pass before attempting an upgrade.

Good performance is reached when the rate of loss remains below or at the ARL value. This performance must be maintained for some period called here good performance time (GPT). The GPT should be greater than T. If the rate of loss ever exceeds the ARL value, then performance is considered poor again, and the timer is reset. Only after good performance has been maintained for a period equal to or greater than GPT, can the link be upgraded.

Once the MRF or the UE determines that bandwidth adaptation is required, each may separately initiate a bandwidth adaptation procedure. It is possible for both the UE and the MRF to initiate bandwidth adaptation for both the uplink and the downlink. This is allowed by the PoC specification. However, it is unnecessary for both the UE and the MRF to initiate bandwidth adaptation procedures. It is recommended that a UE honours a new ptime value and mode-set when it receives any reINVITE/UPDATE request, but that the UE does not actually monitor or perform media changes itself, i.e. the UE should not itself initiate bandwidth adaptation.

As each link "joins" a talk session, the link is given a grade that determines the granted ptime and mode-set (codecs) that may be used on the link. Bandwidth adaptation involves downgrading or upgrading the link and making use of the new media attributes on that link.

Figure 2:
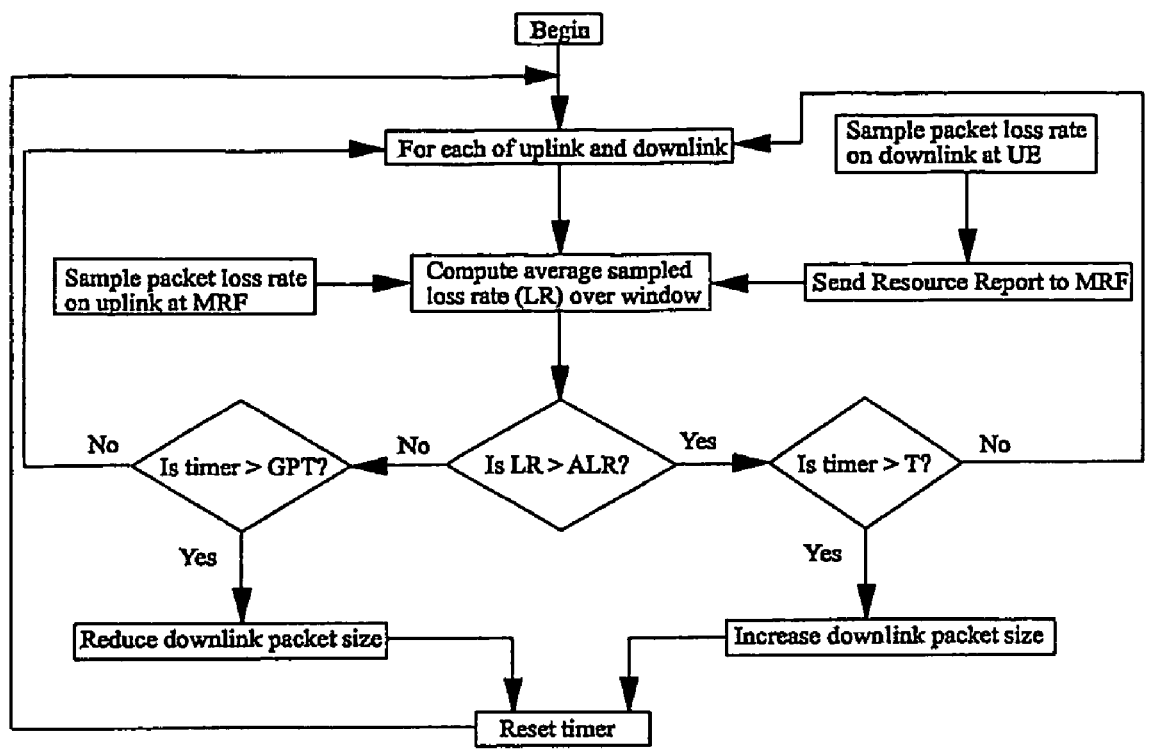
FIG. 2 is a flow diagram illustrating a method for adapting bandwidth usage on a link of a VoIP voice conference.

The flow diagram of FIG. 2 illustrates the method of adaptively varying bandwidth usage.

Considering now each of the various components in detail:

Media Resource Function

Uplink

The MRF can request that a given UE attempt to use less bandwidth on the uplink in order to reduce packet loss on that link. This is accomplished by sending a reINVITE/UPDATE with an SDP (Session Description Protocol, RFC 2327) that requests a higher ptime value or a lower bandwidth codec. This request is sent only to the UE transmitting on the troubled uplink. If the current ptime value has reached the maxptime for that link and the lowest rate codec available to all participants is already being used, then further adaptation cannot be initiated.

Downlink

The MRF can attempt to improve downlink performance in one of two ways:

1. Reorganise the packets for that link in such a way that the packets require less bandwidth. This method is called repacketisation.
2. Request that all other UEs in the session begin to send more bandwidth efficient packets. This method is called Least Common Denominator.

It may be possible to combine these methods; for example, repacketise on a link-by-link basis, whilst requesting lower bandwidth codecs from all UEs.

Considering solution 1. above, the MRF could rearrange packets before sending them on the downlink. This could mean transcoding to a more bandwidth efficient codec, using larger packets with a lower overhead, or a combination of both. However, under the current proposals, the MRF is not capable of transcoding, which leaves only the option of building larger packets. In order to create larger packets, the MRF must buffer, on a downlink-by-downlink basis, smaller packets until a packet of the required size can be composed. If a talk burst ends before enough packets are collected, then whatever packets have been buffered are used to build the final packet which is sent immediately to the UE. As the largest packet corresponds to a 400 ms speech burst, this approach will result in the buffering of no more than 300 bytes per downlink. This is considered manageable.

An assumption is made that re-packetisation is used only to create packets which are larger than those corresponding packets received on the uplink, i.e. re-packetisation is not used to break up received packets into smaller packets. Of course, this possibility is not excluded.

The main advantages of this approach are:

The performances of the remaining downlinks do not suffer due to a single problem link.

It does not require the cooperation of the UEs.

It does not require signalling of new ptime values.

The main disadvantage is:

It requires more complexity in the MRF processor (MRFP) to handle packet processing.

Considering now solution 2., this approach requires that all UEs begin to send more bandwidth efficient packets on their uplink in order to give better performance to a single troubled downlink. This approach requires that a reINVITE/UPDATE be sent by the MRF to each UE in order to move participating UEs to the new media values.

The main advantage of this approach is:

The MRFP is not responsible for manipulating packets.

The main disadvantages are:

All links in the session may be subject to longer delays and/or use lower rate codecs in order to accommodate a single participant. NB. Longer delays arise because of the need to buffer media until an amount sufficient to fill the larger packet size has been received.

If a UE ignores the new ptime value (notified to it in the reINVITE/UPDATE message), packets from that UE may still be lost.

All upgrade/downgrade procedures must consider the lowest attribute of all participants before taking any action.

A considerable amount of additional network signalling is required whenever a link grade changes.

It is worth considering the affect of these solutions when UEs are added to or removed from an ongoing session. If the repacketisation approach (solution 1.) is used for downlink adaptation, then no special action is required to adjust the ptime value when a rate limiting UE leaves or joins a session. If however the Least Common Denominator approach (solution 2.) is used, then remaining UEs must be notified of the new ptime setting if it is higher or lower than the existing settings.

The Adaptive Multi Rate codec defines eight modes of operation. Different handsets have different abilities to support the different modes. A handset is able to supply a list of supported modes, or a "mode-set". In order to determine a mode acceptable to all UEs in a session, the MRF receives a mode-set from each UE, and selects a mode at which all mode-sets intersect.

Irrespective of the bandwidth adaptation approach used, the MRF must make sure that the mode-set used by all UEs is the intersection of all of the participating UEs and the mode-set assigned to the worst performing downlink. This means the intersections of the mode-sets must be recomputed each time a UE joins or leaves the session. If the intersection changes as a result, it must be communicated to the existing participants.

A careful consideration of the various solutions considered above leads to the conclusion that the optimal solution is that which involves the re-packetisation of media at the Media Resource Function prior to sending over the downlink. This minimises or eliminates additional signalling whilst allowing bandwidth usage on the uplinks from other UEs to be maintained at an optimal level taking into account the desire to minimise transmission delays.

Other codecs such as EVRC (used by CDMA handsets) do not make use of the concept of mode-sets.

User Equipment

Uplink

A UE may decrease bandwidth utilization on the uplink by changing to a lower bandwidth codec, by sending larger packets, or using a combination of both actions. The UE does not need to signal the use of a higher ptime value, but it may not use a value lower than that specified by the MRF or a value higher than some maxptime value. The UE does not need to signal the use of a lower rate codec, but it may only use codecs in the current mode-set signalled by the MRF.

Downlink

A UE may request that the MRF send more bandwidth efficient packets on the downlink by sending a reINVITE/UPDATE to the MRF with new media parameters. The MRF may honour the request differently depending on which downlink bandwidth adaptation approach it is using. In case of the Least Common Denominator approach, the MRF will generate an appropriate reINVITE/UPDATE and send it to all other participating UEs in order to meet the new media request. If the MRF is using the repacketisation approach, it will honour the request by buffering more inbound packets and sending larger packets on the downlink.

It is useful to introduce the concept of a link 'grade' for use in handling the upgrading and downgrading of links. For example, one might grade links according to a 1 to 8 scale, where 8 is the grade for the perfect link, and 1 is the grade for the worst link. This means that a link may be downgraded up to a maximum of 7 times. Each link grade maps to a specific ptime value and mode-set (including codec) that may be used on the link. The specific changes at each level may be configurable. Table 1 below shows an example of how the mode-set and ptime values might be set for each of the link grades, where the mode-set shown includes modes 0 and 1 for the AMR codec. In the table, columns 3 and 4 indicate for each grade the bandwidth in kbps which will be required to support mode 0 and mode 1.

When a new UE is added to a session, that UE specifies (in the SDP INVITE message) media parameters that correspond to its understanding of its downlink capabilities. The mode-set specified by the UE represents all of the modes that it supports, and therefore the MRF will always take the intersection of the mode-set initially offered by the UE and the mode-set selected based on the link's grade. The MRF should assign an initial grade to the link based on the ptime value offered. Link upgrading or downgrading starts from the initial grade.

The MRF must be updated in order to perform User Plane Adaptation. The reINVITE/UPDATE signalling is already supported in the MRFC and therefore no changes are necessary. All changes will be made in the MRFP as described in the following sections.

Technical Outline

Media Resource Function Processor

Configuration Parameters

Several new MRFP configuration parameters must be provided and configured via the operations and maintenance interface. The VirtualPD POT should be updated to contain these new values.

Implementation Proposal:

Add the following:

| | | | | |
|---|---|---|---|---|
| | | integer | 20 to 1000, default 400 | Value to use as maximum ptime. |
| minptime | | integer | 20 to 1000, default 80 | Value to use as minimum ptime |
| samples | | integer | 1 to 1000, default 5 | Number of samples to use when calculating rate of loss. |
| downgradeFrequency | | integer | 5 to 1000, default 10 | Frequency of taking link downgrade measures given in samples. Called T in the overview. |
| arl | | float | 0.0 to 100, default 1 | Acceptable rate of loss. Called ARL in the overview. |
| upgradeFreqency | | integer | 5 to 1000, default 30 | Frequency of taking link upgrade measures. |
| gradeSteps | | integer | 5 to 12; default 12 | Number of steps to use in a link grade. This value is used to create a grade table based on the min and max ptime values. |

Performance Measurements

In order to judge the quality of the network and the effectiveness of the UPA procedure and configuration, new performance measurements should be generated.

Implementation Proposal:
A counter should be stepped each time a link is downgraded and bandwidth adaptation procedures are initiated.
A counter should be stepped each time a link is upgraded and bandwidth adaptation procedures are initiated.
The average rate of loss for all links should be reported periodically, perhaps at the conclusion of a session.
The average link grade for all links should be reported periodically, perhaps at the conclusion of a session.

Mode Set Coordination

The mode set provided by each UE in the SDP offer or answer, must be stored and used when making offers to other UEs that join a session. The MRF should make sure that the mode set offered to any UE represents the intersection of the mode sets supported by the current UEs.

Implementation Proposal:
As each participant joins, their SDP will include the mode-set which their UE supports. This set is a series of numbers from 0 to 7. The set should be converted to a bitmap, for example:
Mode-set: 0,1,2,7 becomes 10000111
The MRFP stores this bitmap with data about each participant (PdMember class).
The MRFP keeps a record of the current mode-set in use with the session, also stored as a bitmap. This mode-set starts out as 11111111 for a new empty session.
When a participant joins, that participant's mode-set is "anded" with the current mode-set. The result is used in the answer SDP. If the result is 0, the UE must be rejected and the current set does not change. If the current set has changed as a result of accepting this new participant, then new SDP's must be generated and offered to all current participants.
When a UBE exits the session, the current mode-set for the session is re-calculated by iterating through the list of remaining participants, and "anding" their mode-sets together. The resulting mode-set becomes the current set. If it is different from the mode-set in use before the UE exited the session, a new SDP must be generated and offered to all remaining participants.
The current mode-set for the session may be "anded" with the set required due to the User Plane Adaptation procedures. If it changes as a result, a new SDP must be generated and offered to all participants.

Packet Loss Analysis

Implementation Proposal:
A rate of loss value must be calculated for each link either at the end of each received burst, or when a RR is received.
This current value for each link is stored in the PdMember class.
Each new calculation must be reported to the implemented bandwidth adaptation procedure.

Bandwidth Adaptation—Repacketisation

Implementation Proposal:
Each PdMember class will have an instance of the Bandwidth Adaptation class. All packets processed by a PdMember will be passed to the Bandwidth Adaptation class.
The Bandwidth Adaptation class has buffered previous packets; it will add the packet to its internal buffer. If the buffer has reached the minimum required size, it will be sent.
The Bandwidth Adaptation class must be notified when the floor is released. Any buffered data is sent immediately upon this notification.
If a new packet for the downlink arrives that is smaller than the minimum allowed; and the buffer is empty, then the packet will be placed in the buffer. If the packet is greater than or equal to the minimum size, then it will be sent immediately.
The PdMember will inform the Bandwidth Adaptor each time a new Rate of Loss value is calculated. The Bandwidth Adaptor will, using the configured values for T, ARL, N, and GPT, determine if the related link should be upgraded or downgraded from its current position.
If a downlink's grade is changed, then a new minimum buffer size will be computed.
If the uplink's grade is changed, then a new SDP will be computed and sent on that link.

Link Grading

Implementation Proposal:
A method of selecting a mode-set and ptime values for each link based on a link grade should be established.
Each PdMember class will have an instance of Bandwidth Adapter class.
The Bandwidth Adapter class will maintain two integer values representing the grades for the uplink and the downlink. A static table, indexed by the link grade, will return a mode-set bitmap and a ptime value. The initial grades for a downlink will be assigned by finding the nearest ptime value that matches the offered values. The uplink will be assumed to have the best possible grade. The grade table will be similar to that of Table 1.
This table may be computed based on the minptime and maxptime configuration setting and the gradeSteps setting.

Media Renegotiation

Implementation Proposal:
The MRFP should accept new SDP offers during a session. The remote end may change the mode-set it accepts or request a different ptime. Other changes should result in the offer being rejected. (Optionally, if time permits, we could accept a new address and port)
These offers can change the grade of the downlink. A new grade should be assigned based on this offer. The bandwidth adaptation methods should be applied as though the downlink grade has changed based on the packet loss analysis procedure.
The answer SDP should be generated and returned based on the media settings currently appropriate for the session.

User Plane Adaptation Test Tool

It should be possible to use a tool during basic test and function test to determine if the UPA procedure is working as expected. This means the tool should simulate packet loss on both the uplink and downlink in a predictable way so that the behaviour of the MRFP can be observed. The tool should also accept and comply to new ptime and mode-set values.

Implementation Proposal:
The PoC Simulator or Zeus must be updated to support this testing.
Add media parameters that specify the rate of loss to simulate for a given ptime and the initial downlink media parameters.

TABLE 1

| Grade | ptime | 4.75 kbps | 5.1 kbps |
|---|---|---|---|
| 8 | 80 | 10.2 | 10.6 |
| 7 | 100 | 9.2 | 9.6 |
| 6 | 120 | 8.5 | 8.9 |
| 5 | 140 | 8.1 | 8.5 |
| 4 | 160 | 7.7 | 8.1 |
| 3 | 200 | 7.2 | 7.6 |
| 2 | 260 | 6.7 | 7.1 |
| 1 | 340 | 6.4 | 6.8 |

The invention claimed is:

1. A method of optimising the bandwidth usage on a Real-Time Protocol managed link transporting media from a Media Resource Function node of a cellular telecommunications network to User Equipment, the method comprising:
at the Media Resource Function node, monitoring the rate of packet loss of the link to determine whether the rate of packet loss is unacceptably high or within acceptable limits; and
as a result of said monitoring, adapting the sending rate from at the Media Resource Function node over the link to the User Equipment by re-packetising media, received at the Media Resource Function node from third party nodes, to either increase the size of packets sent over the link when the rate of packet loss is unacceptably high, thereby reducing packet header overhead and reducing bandwidth usage on the link; or to decrease the size of packets sent over the link when the rate of packet loss is within acceptable limits, thereby reducing the transmission delay over the link.

2. A method according to claim 1, wherein the step of monitoring the rate of packet loss of the link comprises sampling.

3. A method according to claim 1, wherein said step of adapting the sending rate is carried out dynamically in response to the monitored rate of packet loss.

4. A method according to claim 1, wherein, in the event that media is to be repacketised at the Media Resource Function, received media is stored at the Media Resource Function node in a buffer until such time as sufficient media has been received to construct a packet of the necessary size.

5. A method according to claim 1 wherein said third party nodes are peer User Equipment (UEs).

6. A Media Resource Function node for use in a cellular telecommunications network, the node handling media sent between itself and user equipment over a Real-Time Protocol managed link, the node comprising:
means for monitoring the rate of packet loss of the downlink to the User Equipment to determine whether the rate of packet loss is unacceptably high or within acceptable limits; and
means for adapting, based upon the monitored properties, the sending rate over the link by re-packetising media received from third party nodes, to increase the size of packets sent over said downlink when the rate of packet loss is unacceptably high, thereby reducing packet header overhead and reducing bandwidth usage on the link; or to decrease the size of packets sent over the link when the rate of packet loss is within acceptable limits, thereby reducing the transmission delay over the link.

7. A media resource function node for use in a cellular telecommunications network, the media resource function node handling media sent between the media resource function node and user equipment over a real-time protocol managed link, the media resource function node comprising control circuitry configured to:
monitor the rate of packet loss of a real-time protocol managed downlink to the user equipment to determine whether a rate of packet loss for the real-time protocol managed downlink is unacceptably high or within acceptable limits; and
adapt, based upon the monitored properties, the sending rate over the real-time protocol managed downlink by re-packetizing media received from third party nodes in order to increase the size of packets sent over the real-time protocol managed downlink when the rate of packet loss is unacceptably high to reduce packet header overhead and reducing bandwidth usage on the real-time protocol managed downlink or to decrease the size of packets sent over the real-time protocol managed downlink when the rate of packet loss is within acceptable limits to reduce the transmission delay over the real-time protocol managed downlink.

* * * * *

UNITED STATES PATENT AND TRADEMARK OFFICE
CERTIFICATE OF CORRECTION

PATENT NO.        : 7,978,604 B2                                    Page 1 of 1
APPLICATION NO.   : 10/590937
DATED             : July 12, 2011
INVENTOR(S)       : Tidwell It is certified that error appears in the above-identified patent and that said Letters Patent is hereby corrected as shown below:

In Column 9, Line 41, delete "UBE" and insert -- UE --, therefor.

In Column 12, Line 2, in Claim 5, delete "(UEs)." and insert -- (UE). --, therefor.

Signed and Sealed this
Twentieth Day of December, 2011

David J. Kappos
*Director of the United States Patent and Trademark Office*